United States Patent
Chaurasia et al.

(10) Patent No.: US 9,298,396 B2
(45) Date of Patent: Mar. 29, 2016

(54) PERFORMANCE IMPROVEMENTS FOR A THIN PROVISIONING DEVICE

(71) Applicant: International Business Machines Corporation, Armonk, NY (US)

(72) Inventors: Ashish Chaurasia, Pune (IN); Sandeep R. Patil, Pune (IN); Prasenjit Sarkar, San Jose, CA (US); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/096,556

(22) Filed: Dec. 4, 2013

(65) Prior Publication Data

US 2015/0154105 A1    Jun. 4, 2015

(51) Int. Cl.
G06F 12/02     (2006.01)
G06F 3/06      (2006.01)

(52) U.S. Cl.
CPC .............. *G06F 3/0683* (2013.01); *G06F 3/064* (2013.01); *G06F 3/0608* (2013.01); *G06F 3/0665* (2013.01)

(58) Field of Classification Search
CPC ..... G06F 3/0608; G06F 3/064; G06F 3/0665; G06F 3/0683
See application file for complete search history.

(56) References Cited

U.S. PATENT DOCUMENTS

| | | | |
|---|---|---|---|
| 7,567,995 B2 | 7/2009 | Maynard et al. | |
| 7,949,847 B2 | 5/2011 | Murase | |
| 8,015,352 B2 | 9/2011 | Zhang et al. | |
| 8,127,096 B1 | 2/2012 | Chatterjee et al. | |
| 8,176,289 B2 | 5/2012 | Frank | |
| 8,479,080 B1 * | 7/2013 | Shalvi et al. | 714/774 |
| 2008/0229048 A1 | 9/2008 | Murase et al. | |
| 2009/0043958 A1 | 2/2009 | Kaneda et al. | |
| 2009/0077327 A1 | 3/2009 | Hara | |
| 2010/0161908 A1 | 6/2010 | Nation et al. | |
| 2010/0262802 A1 | 10/2010 | Goebel et al. | |
| 2010/0332780 A1 | 12/2010 | Furuya | |
| 2011/0191563 A1 | 8/2011 | Acedo et al. | |
| 2012/0203983 A1 | 8/2012 | Benhase et al. | |
| 2012/0226886 A1 | 9/2012 | Hatfield et al. | |
| 2014/0019706 A1 * | 1/2014 | Kanfi | 711/171 |
| 2014/0201492 A1 * | 7/2014 | Luan et al. | 711/173 |

OTHER PUBLICATIONS

Kang S. and Narasimha Reddy, A.L. et al., "An Approach to Virtual Allocation in Storage Systems", Texas A&M University, ACM Journal Name, vol. 1, No. 1, Mar. 2006, <http://www.ece.tamu.edu/~reddy/papers/va-tos-final.pdf>.

"Disk Defragmenter (Windows)—Wikipedia, the free encyclopedia", [online] [retrieved on: Aug. 16, 2013]. <http://en.wikipedia.org/wiki/Disk_Defragmenter_(Windows)>.

* cited by examiner

*Primary Examiner* — Yong Choe
(74) *Attorney, Agent, or Firm* — John W. Hayes; William H. Hartwell (57) ABSTRACT

A computer reduces data fragmentation on a thin provisioned storage system. The computer receives a storage request. The computer determines a virtual storage size based at least in part on the received storage request. The computer creates an assigned virtual list that includes a list of reserved physical storage locations associated with the storage request. The computer further receives a WRITE command, and responsive to the WRITE command, allocates storage based at least in part on the created assigned virtual list.

20 Claims, 5 Drawing Sheets

FIG. 1

| BYTE/BIT | 7 | 6 | 5 | 4 | 3 | 2 | 1 | 0 |
|---|---|---|---|---|---|---|---|---|
| 0 | OPERATION CODE (8Ah) | | | | | | | |
| 1 | WRPROTECT | | | DPO | FUA | RESERVED | FUA_NV | RESERVED |
| 2 | (MSB) | | | | | | | |
| 9 | LOGICAL BLOCK ADDRESS | | | | | | | (LSB) |
| 10 | (MSB) | | | | | | | |
| 13 | TRANSFER LENGTH | | | | | | | (LSB) |
| 14 | RESTRICTED FOR MMC-4 | | RESERVED | | | GROUP NUMBER | | |
| 15 | CONTROL | | | | | | | |

PERFORMANCE IMPROVEMENTS FOR A THIN PROVISIONING DEVICE

FIELD OF THE INVENTION

The present invention relates generally to the field of computer data storage systems, and more particularly to thin provisioning control techniques.

BACKGROUND

In the field of computer storage, thin provisioning refers to the practice of using virtualization technology to give the appearance of having more physical resources than are actually available. Thin provisioning operates by allocating disk storage space in a flexible manner among multiple users, based on the minimum space required by each user at any given time. Each of the application tasks associated with the multiple users operates under the assumption that it has physical memory allocated. The sum of the allocated virtual memory assigned to tasks is typically greater than the total of physical memory. Thin Provisioning, in a shared storage environment, is a method for optimizing utilization of available storage. The concept of thin provisioning is to allocate storage (blocks or other measures of storage capacity) when application data is effectively written to a host attached storage device or volume. This is the fundamental difference between the traditional, fully provisioned volume, where the volume capacity is entirely allocated at the time the volume is created, and thin provisioning, which relies on on-demand allocation of blocks of data versus the traditional method of up-front allocation of all the storage blocks to an application.

SUMMARY

Embodiments of the present invention provide a program product, system, and method in which a computer reduces data fragmentation on a thin provisioned storage system. The computer receives a storage request. The computer determines a virtual storage size based at least in part on the received storage request. The computer creates an assigned virtual list that includes a list of reserved physical storage locations associated with the storage request. The computer further receives a WRITE command, and responsive to the WRITE command, allocates storage based at least in part on the created assigned virtual list. In various embodiments, the virtual storage size is based, at least in part, on an over-provisioning ratio. In various embodiments, the assigned virtual list includes contiguous blocks of physical storage.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In parallel computing environments, multiple applications are running simultaneously, and can access a thin provisioning device at the same time. Since storage blocks are allocated on-demand during a WRITE request, blocks of data for one application can be interspersed with blocks of data of other applications leading to fragmentation.

A hard disk drive (HDD) records data by magnetizing a thin film of ferromagnetic material on a disk. A typical HDD design consists of a spindle that holds flat circular disks, also called platters, which hold the recorded data. Information is written to and read from a platter as it rotates past devices called read-and-write heads that operate in very close proximity over the magnetic surface. An actuator arm (or access arm) moves the read-and-write heads on an arc across the platters as they spin, allowing each head to access almost the entire surface of the platter as it spins. Accessing data requires the mechanical rotation of the platter and the mechanical movement of the actuator arm. Fragmentation of data blocks leads to increased mechanical movements required to access the data resulting in performance degradation.

Where a block of data is discussed herein with respect to data storage, a block may be formed from one or more sectors on a disk drive, for example, where a sector is a portion of a disk track. Sectors themselves may be fixed in size, with various sizes being used in practice depending upon how a particular disk is formatted and the file structure being used.

A thin provisioning device represents, to an application, a virtual storage volume that appears to exceed the physical capacity of a storage device. The ratio between the virtual capacity and the physical capacity is known as the over-provisioning ratio. At the configuration of a thin provisioning device, a system administrator can use past input/output (I/O) behavior to determine the over-provisioning ratio. For example, if a system administrator determines that applications are typically using 80% of their requested space, an application of 4 GB of physical storage space can be represented by the thin provisioning device as 5 GB of virtual storage, with an over-provisioning ratio of 1.25. Since the virtual storage exceeds the physical capacity of the device, memory is allocated to applications on a just-enough and just-in-time basis. This memory allocation scheme can lead to fragmentation of the data for any particular application. The present invention creates a table of preferred storage locations that can be used when allocating blocks of memory to an application.

Figure 1:
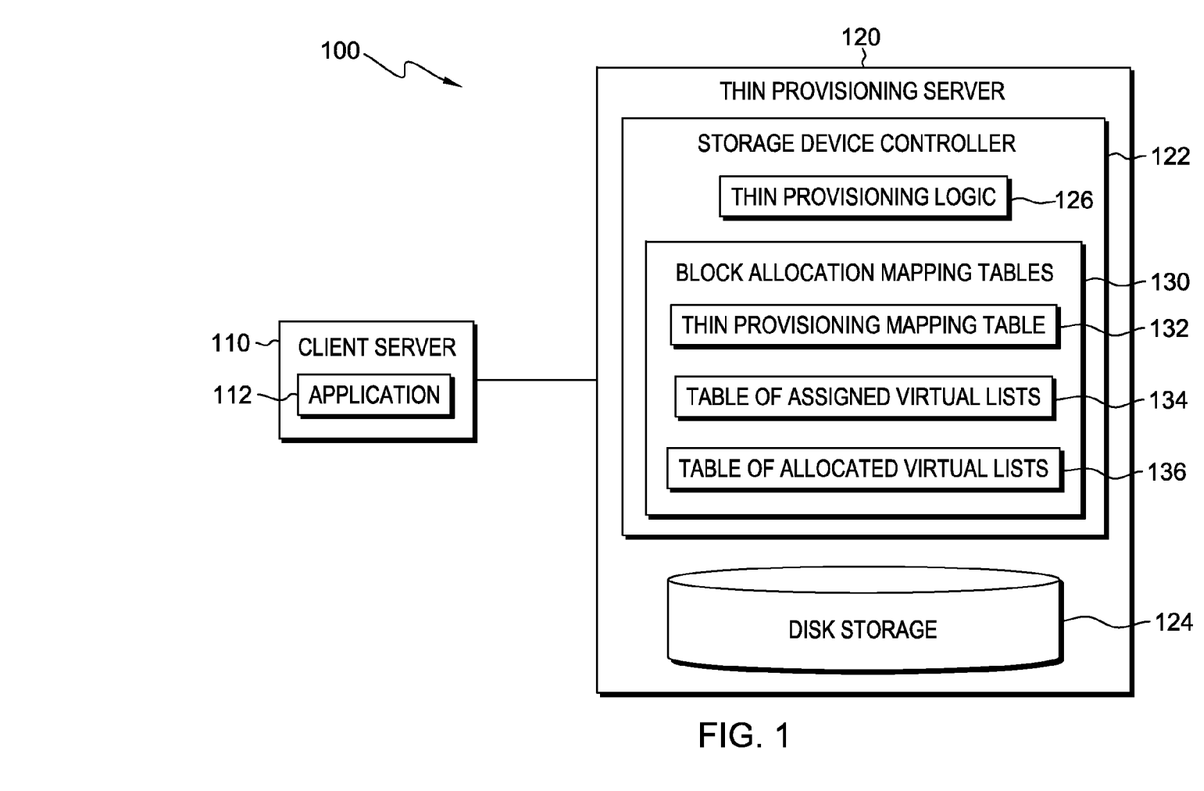
FIG. 1 is a block diagram of a thin provisioning storage environment 100 in accordance with one embodiment of the present invention.

The present invention will now be described in detail with reference to the Figures. FIG. 1 depicts a thin provisioning storage environment 100 in accordance with one embodiment of the present invention. FIG. 1 provides only an illustration of one embodiment and does not imply any limitations with regard to the environments in which different embodiments may be implemented.

Thin provisioning storage environment 100 includes client server 110 and thin provisioning server 120. In various embodiments of the invention, each one of client server 110 and thin provisioning server 120, described in more detail below with respect to FIG. 5, can be a desktop computer, laptop computer, tablet computer, personal digital assistant (PDA), a mainframe computer, or a networked server computer. Further, each one of client server 110 and thin provisioning server 120 can include computing systems utilizing clustered computers and components to act as single pools of seamless resources, or can represent or exist within one or more cloud computing datacenters. In general, client server 110 may be any electronic device or computing system capable of sending and receiving data, and communicating with thin provisioning server 120.

In various embodiments of the invention, client server 110 includes application 112. Application 112 operates on client server 110 and can be any computer program or software requiring data storage. Application 112 operates to send data to, and receive data from thin provisioning server 120. For example, application 112 can be enterprise class software such as a file manager, a database manager, or a volume manager.

Thin provisioning server 120 operates to receive, store, and send data to and from application 112 on client server 110. Thin provisioning server 120 may be a storage device server, a web server, or any other electronic device or computing system capable of receiving, storing, and sending data. In various embodiments, thin provisioning server 120 can be network attached storage (NAS), a storage area network (SAN), or a server computing system utilizing multiple computers as a server system, such as in a cloud computing environment. Thin provisioning server 120 includes storage device controller 122 and disk storage 124. Storage device controller 122 operates to control the read and write operations of thin provisioning server 120. Based on instructions received from application 112 on client server 110, storage device controller 122 allocates or de-allocates blocks of storage, executes WRITE operations to store data received from application 112 and executes READ operations to retrieve data requested by application 112. Disk storage 124 is the physical storage media that can store the data received from application 112.

In various embodiments of the invention, storage device controller 122 includes thin provisioning logic 126 and block allocation mapping tables 130. Thin provisioning logic 126 operates on storage device controller 122 to control the allocation and de-allocation of data storage blocks on disk storage 124. Thin provisioning logic 126 can receive from application 112, a request for allocation of storage. Thin provisioning logic 126 can determine the size requirements of a virtual list of data storage blocks based on the allocation request and the over-provisioning ratio. In various embodiments, the over-provisioning ratio is received from a system administrator. In other embodiments, thin provisioning logic 126 can determine the over-provisioning ratio based on past behavior of an application. For example, application 112 previously requested an allocation of 8 GB of storage, and made WRITE requests for 5 GB of data. Thin provisioning logic 126 can calculate an over-provisioning ratio of the virtual request of 8 GB over the actual data usage of 5 GB, or an over-provisioning ratio of 1.6. A safety margin can also be applied. The safety margin can be a fixed value of, for example, 20%, or the safety margin can be determined based on a statistical analysis of previous allocation requests.

Having determined the size requirements of the virtual list of data storage blocks, thin provisioning logic 126 determines the availability of sufficient storage blocks to satisfy the allocation request. In various embodiments of the invention, thin provisioning logic 126 maintains thin provisioning mapping table 132 as described in detail below with respect to Table 1.

In various embodiments of the invention, block allocation mapping tables 130 includes thin provisioning mapping table 132, table of assigned virtual lists 134, and table of allocated virtual lists 136. These tables are used by thin provisioning logic 126 to control the assignment and allocation of storage blocks of disk storage 124, as described in detail below.

Having determined the availability of sufficient storage blocks, thin provisioning logic 126 creates or appends an assigned virtual list that includes an application ID, and the desired virtual blocks of storage. Thin provisioning logic 126 reserves the physical storage locations associated with the storage request by creating the assigned virtual list, but does not allocate the physical storage to the application until receiving a WRITE request as described below. Thin provisioning logic 126 updates table of assigned virtual lists 134 to include the created assigned virtual list as described in detail below with respect to Table 2. In various embodiments of the invention, an assigned virtual list, within table of assigned virtual lists 134, contains a list of contiguous blocks of storage for application 112 that are not yet allocated to a physical location on disk storage 124. In another embodiment, the assigned virtual list may contain a list of blocks of storage, some of which may be non-contiguous, that, nonetheless, provide for efficient retrieval by, for instance, reducing the movement of the read-and-write heads in a multi-disk system.

As noted above, thin provisioning logic 126 reserves physical storage associated with the assigned virtual list. For simplicity of operation, the reserved blocks of physical storage may be related to the assigned virtual blocks in a one-to one relationship. That is, Virtual Block0 may correspond directly to Physical Block0 on disk storage 124, Virtual Block1 may correspond directly to Physical Block1 on disk storage 124, and so on. Thus, if the assigned virtual blocks are contiguous, then the reserved physical blocks will also be contiguous.

However, in the interest of optimizing efficiency of data storage and retrieval operations, by reducing unnecessary movement of the read/write heads on disk storage 124, the mapping between assigned virtual blocks and reserved physical blocks may be a logical mapping. Logical mapping of the physical storage blocks may occur, for example, when all of the contiguous blocks of a particular track on disk storage 124 have been reserved, and the next block of physical memory is on an adjacent track. In the interest of access efficiency, reserving the next block of physical storage on the same track of an adjacent platter may be deemed an optimum mapping by thin provisioning logic 126. This is due to the fact that, in most multiple-platter disk drives, all of the read/write heads are associated with a single actuator arm, and thus move in unison to maintain track alignment with adjacent platters.

After receiving a WRITE request from application 112, thin provisioning logic 126 uses the assigned virtual list of table of assigned virtual lists 134 to allocate the physical location on disk storage 124 to the data of the received WRITE request. Further, thin provisioning logic 126 creates or appends table of allocated virtual lists 134 as described in detail below with respect to Table 4. Thin provisioning logic 126 can also remove or append an allocated virtual list from table of allocated virtual lists 136, or remove or append an assigned virtual list from table of assigned virtual lists 134, based on a de-allocation request from application 112.

Thin provisioning mapping table 132 includes a listing for each virtual block, a status or state, and, if allocated, an associated physical block. Table 1 shows an example of thin provisioning mapping table 132 according to various embodiments of the invention.

TABLE 1

Thin Provisioning Mapping Table

| Virtual Block | Status | Physical Block |
| --- | --- | --- |
| VBlock0 | Allocated | PBlock0 |
| VBlock1 | Allocated | PBlock1 |
| VBlock2 | Assigned | — |
| VBlock3 | Assigned | — |
| VBlock4 | Freed | — |
| VBlock5 | Freed | — |

Table of assigned virtual lists 134 includes a listing of assigned virtual lists wherein each assigned virtual list contains a list of contiguous blocks of storage assigned to a particular application. Table 2 shows an example of table of assigned virtual lists 134 according to various embodiments of the invention. Each line of Table 2 is an assigned virtual list created by thin provisioning logic 126 in response to an allocation request, and includes an application ID, the assigned starting storage block, and the assigned ending storage block. The number of assigned storage blocks is determined by thin provisioning logic 126 based on the requested allocation and the over-provisioning ratio as described above. An application may own more than one assigned virtual list, as shown below, based on additional allocation requests received by thin provisioning logic 126 from a given application. For example, after an initial assignment of 100 blocks to application ID 0, and subsequent assignments to application ID's 1 and 2, an additional assignment is made to application ID 0 based on an additional allocation request requiring 50 blocks of storage. Further, application ID 2 may receive an additional allocation request for 60 blocks of storage. The storage blocks specified in the assigned virtual list have not yet been allocated to the application, since allocation of storage blocks occurs only after a received WRITE command. It should be noted that the virtual list is intended to represent a set of contiguous blocks in physical storage.

TABLE 2

Table of Assigned Virtual Lists

| Application ID | StartBlock | EndBlock |
| --- | --- | --- |
| 0 | 0 | 99 |
| 1 | 100 | 199 |
| 2 | 200 | 249 |
| 0 | 250 | 299 |
| 2 | 300 | 359 |

Table 3 shows an example of table of assigned virtual lists 134 following several WRITE requests received by thin provisioning logic 126. In this example, a WRITE request was received from application ID 0 requiring 10 blocks of storage, a WRITE request was received from application ID 1 requiring 50 blocks of storage, and a WRITE request was received from application ID 2 requiring 20 blocks of storage. Based on the WRITE command, thin provisioning logic 126 removes the requested data blocks from the assigned virtual lists of table of assigned virtual lists 134. Additionally, thin provisioning logic 126 appends table of allocated virtual lists 136 to indicate the allocation of the storage blocks. Table of allocated virtual lists 136 includes a listing of allocated virtual lists wherein each allocated virtual list contains a list of contiguous blocks of storage allocated to a particular application based on a WRITE command received by thin provisioning logic 126. Table 4 shows an example of table of allocated virtual lists 136 following the several WRITE requests received by thin provisioning logic 126: a first WRITE command from application ID 0 requiring 10 blocks of storage, a second WRITE command from application ID 1 requiring 50 blocks of storage, and a third WRITE command from application ID 2 requiring 20 blocks of storage.

TABLE 3

Table of Assigned Virtual Lists (following WRITE requests)

| Application ID | StartBlock | EndBlock |
|---|---|---|
| 0 | 10 | 99 |
| 1 | 150 | 199 |
| 2 | 220 | 249 |
| 0 | 250 | 299 |
| 2 | 300 | 359 |

TABLE 4

Table of Allocated Virtual Lists

| Application ID | StartBlock | EndBlock |
|---|---|---|
| 0 | 0 | 9 |
| 1 | 100 | 149 |
| 2 | 200 | 219 |

Figure 2:
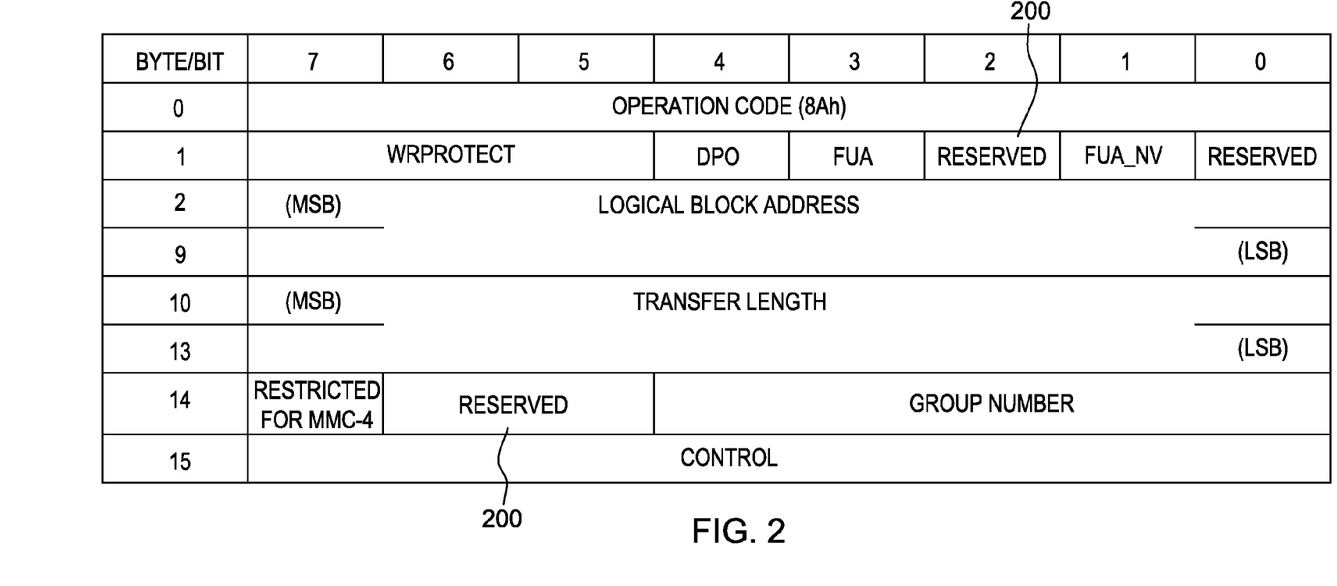
FIG. 2 depicts an example of a command descriptor block (CDB) for a small computer system interface (SCSI) WRITE command per SCSI-3, in accordance with an embodiment of the present invention.

FIG. 2 depicts an example of a command descriptor block (CDB) for a small computer system interface (SCSI) WRITE command per SCSI-3. SCSI is a high-speed, intelligent peripheral I/O bus with a device independent protocol, allowing different peripheral devices and hosts to be interconnected on the same bus. In other embodiments, other protocols can be used, such as, for example without limitation, a protocol channel such as remote procedure call (RPC).

A SCSI CDB can be used to control the transfer of data between computers and peripheral devices, such as client server 110 and thin provisioning server 120. The CDB includes operation codes and command specific parameters. The CDB also includes reserved, or unused, bits.

In various embodiments of the invention, reserved bits 200, which include bit 2 of Byte 1, and bits 5 and 6 of Byte 14, can be utilized to specify a particular application ID during the transmittal of the various read, write, allocation request, and de-allocation request commands. Three bits can specify up to eight application ID's. In cases requiring more than eight application ID's, a SCSI extended CDB can be used.

Figure 3:
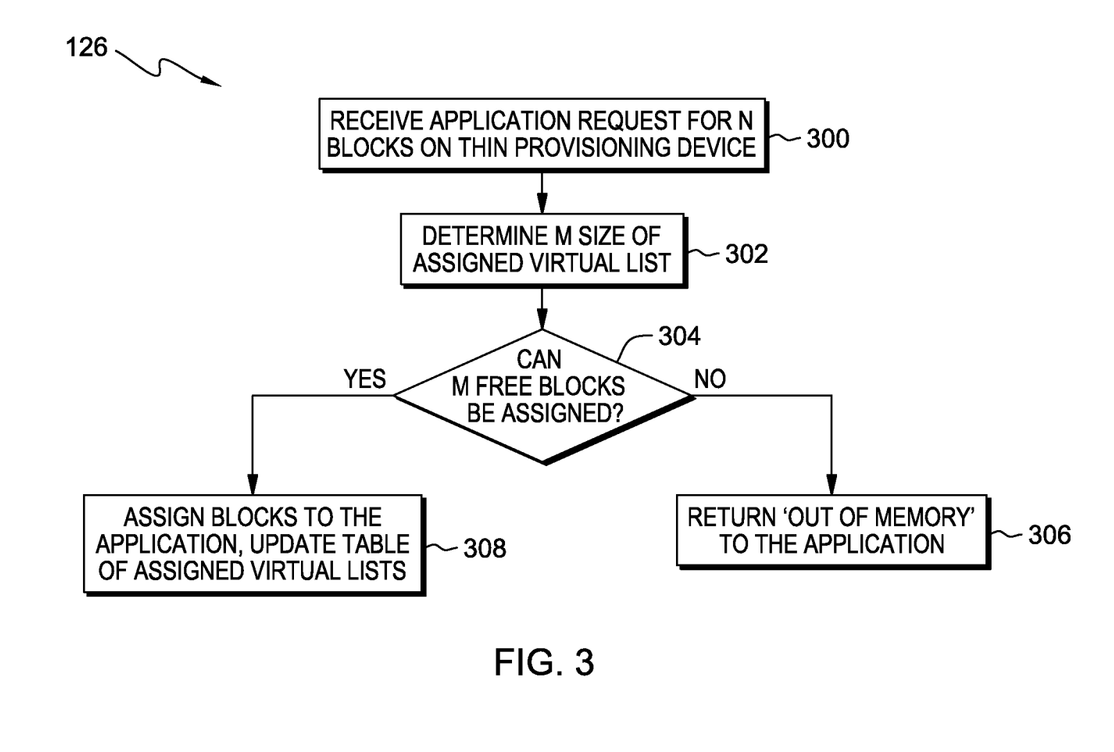
FIG. 3 is a flowchart depicting operational steps of a block allocation request received by thin provisioning logic of FIG. 1, in accordance with an embodiment of the invention.

FIG. 3 is a flowchart depicting operational steps of a block allocation request received by thin provisioning logic 126 of FIG. 1, in accordance with an embodiment of the invention. For example, thin provisioning logic 126 operating on thin provisioning server 120, receives an allocation request from an application for N blocks of storage (step 300). Based on the request for N blocks of storage and a received over-provisioning ratio, thin provisioning logic 126 determines the size, M, of the required assigned virtual list (step 302). Having determined the required size of the assigned virtual list, thin provisioning logic 126 uses thin provisioning mapping table 132 to determine if M free blocks of storage are available to be assigned to the application (decision 304). If M blocks of storage are not available (decision 304, 'NO' branch), thin provisioning logic 126 returns an 'out of memory' response to the application (step 306). If M blocks of storage are available (decision 304, 'YES' branch), thin provisioning logic 126 assigns the M blocks of storage to the application (step 308). Thin provisioning logic 126 updates thin provisioning mapping table 132 to show the status of the M virtual blocks as 'assigned' and appends the table of assigned virtual lists 134 to include an assigned virtual list of M blocks of storage assigned to the application.

Figure 4:
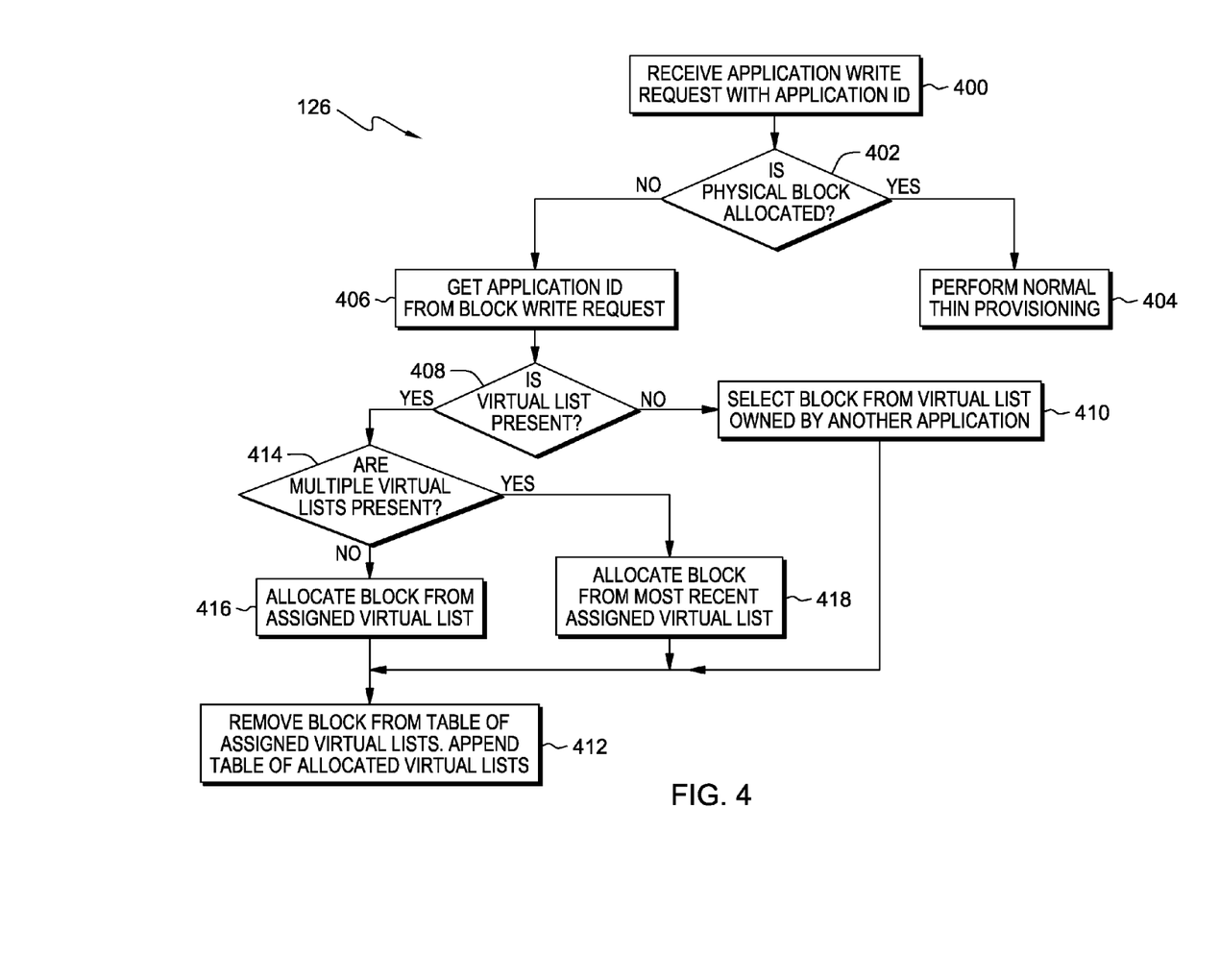
FIG. 4 is a flowchart depicting operational steps of a WRITE request received by thin provisioning logic of FIG. 1, in accordance with an embodiment of the invention.

FIG. 4 is a flowchart depicting operational steps of a WRITE request received by thin provisioning logic 126 of FIG. 1, in accordance with an embodiment of the invention. For example, thin provisioning logic 126 receives a WRITE request from an application, for example, application 112, which includes an application ID in the CDB (step 400). Thin provisioning logic 126 determines if physical block(s) have been previously allocated to the application (decision 402). If physical block(s) have been previously allocated (decision 402, 'YES' branch), thin provisioning logic 126 performs a normal thin provisioning WRITE command on disk storage 124 (step 404). If thin provisioning logic 126 determines that physical block(s) have not been previously allocated (decision 402, 'NO' branch), thin provisioning logic 126 gets the application ID from the CDB of the WRITE request (step 406). Using the application ID, thin provisioning logic 126 checks table of assigned virtual lists 134, determining if a virtual list is present for the application ID (decision 408). If an assigned virtual list is not present in table of assigned virtual lists 134 (decision 408, 'NO' branch), thin provisioning logic 126 selects block(s) from a virtual list owned by another application (step 410). In various embodiments, thin provisioning logic 126 selects blocks from a virtual list owned by another application based on the proximity of blocks of storage previously allocated to the application. Thin provisioning logic 126 then updates the assigned virtual list of table of assigned virtual lists 134 to remove the selected blocks of storage owned by the other application, and also appends table of allocated virtual lists 136 to include the allocation of storage block(s) to the application (step 412). If thin provisioning logic 126 determines that a virtual list is present for the application ID (decision 408, 'YES' branch), thin provisioning logic 126 further determines if multiple virtual lists are present in table of assigned virtual lists 134 for the application ID (decision 414). If multiple virtual lists are not present for the application ID in table of assigned virtual lists 134 (decision 414, 'NO' branch), thin provisioning logic 126 allocates the block(s) from the assigned virtual list (step 416). Thin provisioning logic 126 then updates the assigned virtual list of table of assigned virtual lists 134 removing the allocated blocks of storage, and also appends table of allocated virtual lists 136 to include the allocation of storage block(s) to the application (step 412). If multiple virtual lists are present for the application ID in table of assigned virtual lists 134 (decision 414, 'YES' branch), thin provisioning logic 126 allocates the block(s) from the most recently assigned virtual list (step 418). Thin provisioning logic 126 then updates the assigned virtual list of table of assigned virtual lists 134, removing the allocated blocks of storage, and also appends table of allocated virtual lists 136 to include the allocation of storage block(s) to the application (step 412).

Figure 5:
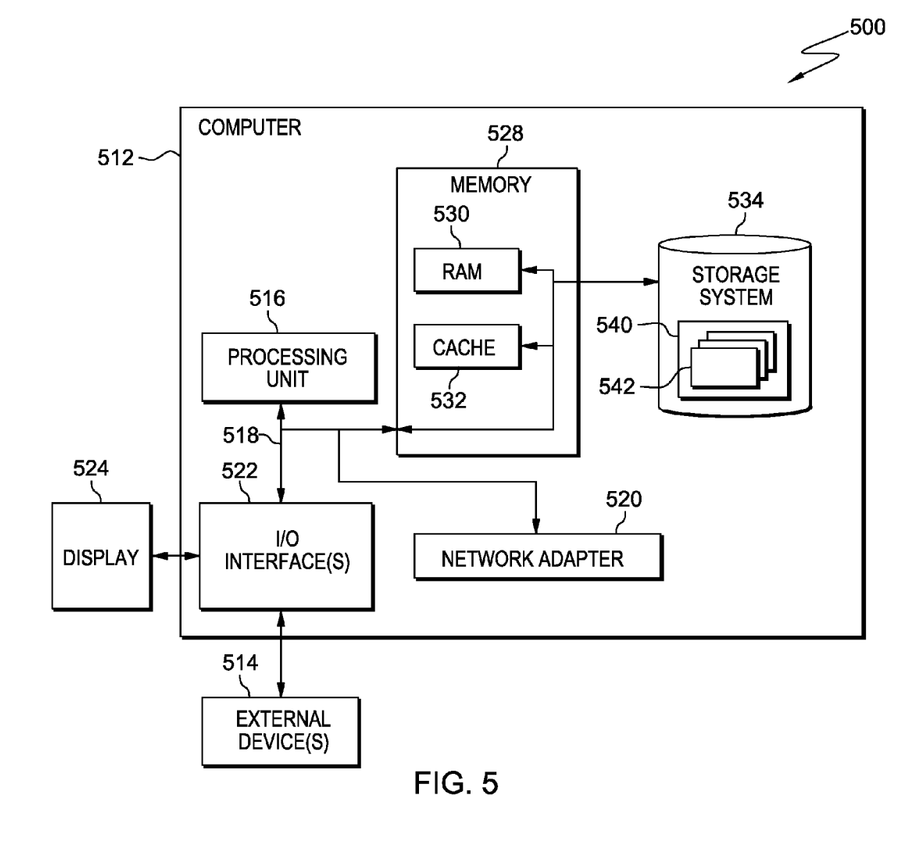
FIG. 5 is a functional block diagram of a computer system in accordance with an embodiment of the present invention.

Referring now to FIG. 5, a functional block diagram of a computer system in accordance with an embodiment of the present invention is shown. Computer system 500 is only one example of a suitable computer system and is not intended to suggest any limitation as to the scope of use or functionality of embodiments of the invention described herein. Regardless, computer system 500 is capable of implementing and/or performing any of the functionality set forth hereinabove.

In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of client server 110 and thin provisioning server 120 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 in computer system 500 is shown in the form of a general-purpose computing device. The components of computer 512 may include, but are not limited to, one or more processors or processing units 516, memory 528, storage system 534, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 can include computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program 540, having one or more program modules 542, may be stored in storage system 534 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Application 112 and thin provisioning logic 126 can be implemented as or can be an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication can occur via Input/Output (I/O) interfaces 522. Still yet, computer 512 can communicate with one or more networks such as a local area network (LAN), a general wide area network (WAN), and/or a public network (e.g., the Internet) via network adapter 520. As depicted, network adapter 520 communicates with the other components of computer 512 via bus 518. It should be understood that, although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Based on the foregoing, a computer system, method, and program product have been disclosed for a thin provisioning data storage system. However, numerous modifications and substitutions can be made without deviating from the scope of the present invention. Therefore, the present invention has been disclosed by way of example and not limitation.

What is claimed is:

1. A method for reduced data fragmentation on a thin provisioned storage system, the method comprising:
   receiving, by one or more processors, a storage request;
   determining, by one or more processors, a virtual storage size based, at least in part, on the received storage request and an over-provisioning ratio, wherein the over-provisioning ratio is determined based, at least in part, on previous storage usage; and
   creating, by one or more processors, an assigned virtual list that includes a list of reserved physical storage locations associated with the storage request.

2. The method of claim 1, further comprising:
   receiving, by one or more processors, a WRITE command;
   responsive to the WRITE command, allocating storage based, at least in part, on the created assigned virtual list; and
   creating, by one or more processors, an allocated virtual list.

3. The method of claim 1, wherein the assigned virtual list includes contiguous blocks of physical storage.

4. The method of claim 1, wherein an application owns more than one assigned virtual list.

5. The method of claim 1, wherein the assigned virtual list is included in a table of assigned virtual lists.

6. The method of claim 1, wherein the assigned virtual list includes blocks of physical storage based, at least in part, on efficient retrieval.

7. The method of claim 1, wherein an assigned virtual list is removed based, at least in part, on a de-allocation command.

8. A computer program product for reduced data fragmentation on a thin provisioned storage system, the computer program product comprising:
   one or more computer-readable tangible storage media and program instructions stored on at least one of the one or more storage media, the program instructions comprising:
   program instructions to receive a storage request;
   program instructions to determine a virtual storage size based, at least in part, on the received storage request and an over-provisioning ratio, wherein the over-provisioning ratio is determined based, at least in part, on previous storage usage; and
   program instructions to create an assigned virtual list that includes a list of reserved physical storage locations associated with the storage request.

9. The computer program product of claim 8, further comprising:
   program instructions to receive a WRITE command;
   program instructions to, responsive to the WRITE command, allocate storage based, at least in part, on the created assigned virtual list; and
   program instructions to create an allocated virtual list.

10. The computer program product of claim 8, wherein the assigned virtual list includes contiguous blocks of physical storage.

11. The computer program product of claim 8, wherein an application owns more than one assigned virtual list.

12. The computer program product of claim 8, wherein the assigned virtual list is included in a table of assigned virtual lists.

13. The computer program product of claim 8, wherein the assigned virtual list includes blocks of physical storage based, at least in part, on efficient retrieval.

14. The computer program product of claim 8, wherein an assigned virtual list is removed based, at least in part, on a de-allocation command.

15. A system for reduced data fragmentation on a thin provisioned storage system, the system comprising:
   one or more processors, one or more computer-readable memories, one or more computer-readable tangible storage media, and program instructions stored on at least one of the one or more storage media for execution by at least one of the one or more processors via at least one of the one or more memories, the program instructions comprising:
   program instructions to receive a storage request;
   program instructions to determine a virtual storage size based, at least in part, on the received storage request and an over-provisioning ratio, wherein the over-provisioning ratio is determined based, at least in part, on previous storage usage; and
   program instructions to create an assigned virtual list that includes a list of reserved physical storage locations associated with the storage request.

16. The system of claim 15, further comprising:
   program instructions to receive a WRITE command;
   program instructions to, responsive to the WRITE command, allocate storage based, at least in part, on the created assigned virtual list; and
   program instructions to create an allocated virtual list.

17. The system of claim 15, wherein the assigned virtual list includes contiguous blocks of physical storage.

18. The system of claim 15, wherein an application owns more than one assigned virtual list.

19. The system of claim 15, wherein the assigned virtual list is included in a table of assigned virtual lists.

20. The system of claim 15, wherein an assigned virtual list is removed based, at least in part, on a de-allocation command.

* * * * *